US010412097B1

(12) United States Patent
Banshats et al.

(10) Patent No.: US 10,412,097 B1
(45) Date of Patent: Sep. 10, 2019

(54) METHOD AND SYSTEM FOR PROVIDING DISTRIBUTED AUTHENTICATION

(71) Applicant: Intuit Inc., Mountain View, CA (US)

(72) Inventors: Sergey Banshats, Petah Tikva (IL); Gleb Keselman, Modiin (IL)

(73) Assignee: Intuit Inc., Mountain View, CA (US)

( * ) Notice: Subject to any disclaimer, the term of this patent is extended or adjusted under 35 U.S.C. 154(b) by 235 days.

(21) Appl. No.: 15/414,206

(22) Filed: Jan. 24, 2017

(51) Int. Cl.
 *H04L 29/06* (2006.01)
(52) U.S. Cl.
 CPC .......... *H04L 63/108* (2013.01); *H04L 63/083* (2013.01); *H04L 63/0823* (2013.01)
(58) Field of Classification Search
 None
 See application file for complete search history.

(56) References Cited

U.S. PATENT DOCUMENTS

| | | | |
|---|---|---|---|
| 9,384,362 B2 | 7/2016 | Cabrera et al. | |
| 2003/0055873 A1* | 3/2003 | Pedone | H04L 29/06 709/203 |
| 2006/0100935 A1* | 5/2006 | Klawitter | G06Q 20/06 705/1.1 |
| 2008/0271129 A1* | 10/2008 | Mukkara | H04L 63/08 726/8 |
| 2012/0324225 A1 | 12/2012 | Chambers et al. | |
| 2013/0219462 A1 | 8/2013 | Aratsu et al. | |
| 2014/0098674 A1* | 4/2014 | Sonoda | H04L 49/3009 370/238 |
| 2014/0337528 A1 | 11/2014 | Barton et al. | |
| 2014/0380048 A1 | 12/2014 | He et al. | |
| 2015/0222606 A1 | 8/2015 | Yan | |
| 2016/0119306 A1* | 4/2016 | Matthews | H04L 63/08 726/6 |
| 2016/0189158 A1* | 6/2016 | Eramian | G06Q 20/40145 705/44 |
| 2018/0115550 A1 | 4/2018 | Sapir et al. | |

OTHER PUBLICATIONS

Thompson; "PAM 2man Authentication Plugin for Unix and Linux;" Cyber Operations, Analysis, and Research at Argonne National Laboratory; [online] Blog post dated Sep. 15, 2015.
Kolbel, C.; "privacyIDEA Authentication System, Release 2.17;" [online], [retrieved Jan. 23, 2017]. Retrieved from the internet <URL:https://media.readthedocs.org/pdf/privacyidea/latest/privacyidea.pdf>.

\* cited by examiner

*Primary Examiner* — Trang T Doan
(74) *Attorney, Agent, or Firm* — Hawley Troxell Ennis & Hawley LLP; Philip McKay

(57) ABSTRACT

A system for distributed authentication provide third party authentication of access requests. A secure computing system is provided which ignores or otherwise denies all access requests from users that have not yet been validated by a separate validation computing system as being authorized to access the secure computing system, but once a given user is validated by a third party authentication system as being authorized to access the secure computing system, results data is made available on the third party validation computing system which effectively enables communication between a user computing system and the secure computing system. Communication is thereafter established and controlled with the user computing system by the secure computing system.

24 Claims, 3 Drawing Sheets

METHOD AND SYSTEM FOR PROVIDING DISTRIBUTED AUTHENTICATION

BACKGROUND

As various forms of distributed computing, such as cloud computing, have come to dominate the computing landscape, computing system security has become increasingly important. Various forms of malware protection, virus protection and other forms of protection are typically provided to computing systems to protect the software and services employed by those computing systems. However, proper computing system security includes more than just protecting a computing system from virus's and malware.

In situations where one or more secure computing systems contain especially sensitive information or where one or more secure computing systems provide services that have access to or otherwise directly or indirectly utilize sensitive information, knowing which users or computing systems should be provided access to those secure computing systems and computing systems that have access to secure computing systems is often difficult. Unintentionally granting a malicious user or a computing system associated with a malicious user access to a secure computing system can be a problem in many ways. For example, such a malicious user may, by virtue of login credentials being presented at a time of login, unknowingly be granted authority to perform sensitive process operations, use processes that grant access to other computing systems, access or otherwise use sensitive data, or install corrupted or malware-related software, among other possibilities. Granting such misplaced authority may harm the secure computing system itself, allow other bad actors to access or otherwise use data or processes associated with the secure computing system, or harm the computing systems associated with the secure computing system in other ways. Certainly, allowing a malicious user access to a secure computing system can compromise its security.

The problems and solutions disclosed herein relate to computing system security, and primarily address a shortcoming in security relating to secure computing systems interacting with or otherwise executing sensitive processes or sensitive data. Typical security protocols involve a single secure computing system receiving an access request and the secure computing system making a decision to allow or disallow the requested access to the secure computing system. However, there is a shortfall in the security protocols because there is no third party assessment of whether a user or computing system associated with the request is authorized to access the secure computing system, or whether the access request is being submitted for a valid reason. In some circumstances, allowing a valid user access to a secure computing system when there is no reason for the user to be accessing the secure computing system is problematic. Thus, a user of prior art systems may be granted access based on false credentials, or a legitimate user may be allowed access to the secure computing system for unknown, possible malicious or nefarious purposes.

Therefore, there is a longstanding technical problem in that the prior art fails to ensure that only valid, authorized persons are granted access to or are otherwise allowed to use secure computing systems on a need-to-know basis.

SUMMARY

In one embodiment, methods and systems discussed herein solve the problem discussed above, thus providing a technical solution to the technical problem of failing to ensure that only valid, authorized persons are granted access to or are otherwise allowed to use secure computing systems, provided that there is a good reason to grant access.

In one embodiment, three or more separate computing systems are provided, a first user computing system where a user of the user computing system desires access to a second computing system, e.g. a secure computing system. Access to the second computing system is only provided after a third computing system, e.g. a validation computing system, first validates the user and/or the user computing system as being authorized to access the secure computing system.

Herein, when reference is made to a validation computing system, it is intended that one, two, or more validation computing system perform portions, or all, of the validation processes. Should two or more validation computing systems be employed, each performing different portions of the validation processes, or perhaps even performing overlapping portions of the validations processes, those two or more validation computing systems must agree, in one embodiment, in order for a given requesting user to be allowed access to the secure computing system.

In one embodiment, receipt of an access request provided within access request data is made at the secure computing system. Responsive to receipt of the access request within the access request data, the secure computing system establishes a secure communications path with a separate, distinct validation computing system, and results data on or accessible to the validation computing system is accessed to determine whether the user submitting the request is a valid, authorized user of the secure computing system. Further, in various embodiments, a reason indicated by reason data submitted within or with the request data must correspond to one or more previously validated reasons reflected in historical condition data of the validation computing system. If the user is authorized and the reason the user desires access is valid, validation computing system results data is updated to reflect that the requesting user is allowed access to the secure computing system, a condition that is detected by the secure computing system through communication by the secure computing system with the validation computing system. Responsive to confirmation of the user being validated, the secure computing system establishes a secure communications path with a computing system associated with the user who submitted the request. In one embodiment, the authorization processes discussed herein are applied to a computing system associated with the user so that only previously authorized computing systems are granted authority to interact with the secure computing system.

The summary of the technical solution provided above provides a detailed solution to a technical problem existing throughout computing system technologies. The solution applies to all types of computing systems including desktop systems, mobile computing systems, virtual assets such as virtual machines, databases, and other network accessible devices. For reasons provided above, the subject matter herein falls outside the realm of an abstract idea, and is additionally significantly more than an abstract idea.

These embodiments and other related embodiments will be discussed in greater detail below.

Figure 1:
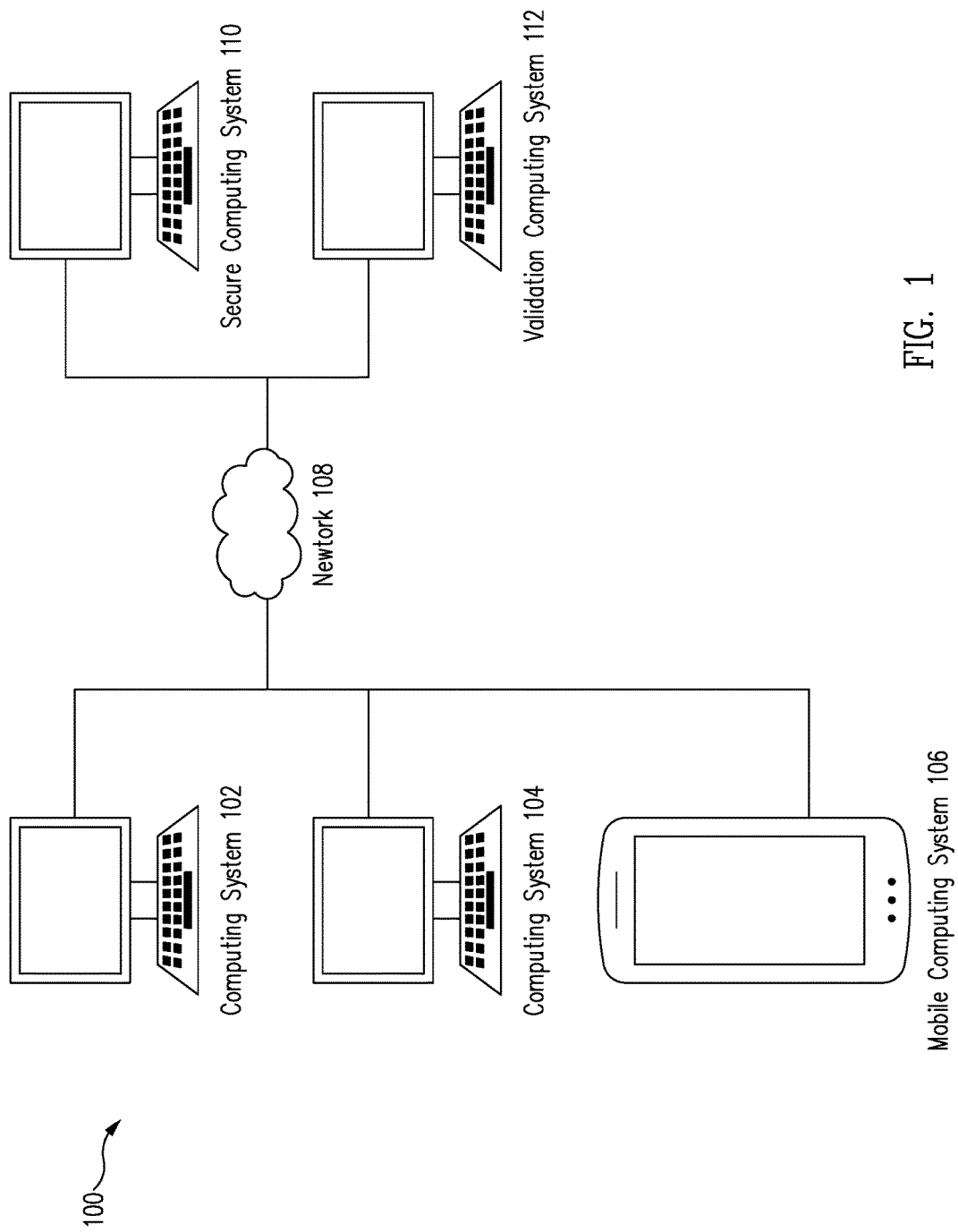
FIG. 1 is a functional block diagram showing the interaction of various elements for implementing one embodiment of a system for distributed authentication.

Common reference numerals are used throughout the figures and the detailed description to indicate like elements. One skilled in the art will readily recognize that the above figures are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art. Features of one or more different embodiments described herein may be combined with features of one or more other embodiments also discussed herein in order to form new embodiments, without departing from the scope of this disclosure.

On occasion, this disclosure refers to a "portion," or "at least a portion," of something, such as "at least a portion of login data." It is intended that the word portion refer to any piece or subset, however small or large, of the entity being referred to, including the entirety of the entity.

In accordance with one embodiment, a system for distributed authentication includes process operations stored within memory modules of and executed by computing processors of one or more computing systems.

As used herein, the term "computing system", includes, but is not limited to, a server computing system, a workstation, a desktop computing system, a database system or storage cluster, a switching system, a router, any virtual asset such as a virtual machine, database, or other virtual asset known to those of ordinary skill or later developed, any hardware system, any communications systems, any form of proxy system, a gateway system, a firewall system, a load balancing system, a virtual server, an instance in a cloud infrastructure, a cloud infrastructure access system, a mobile device, a remote sensor, a laptop, point-of-sale devices, or any device, subsystem, or mechanism that includes components that can execute all, or part, of any one of the processes and/or operations as described herein.

In addition, as used herein, the term computing system, can denote, but is not limited to, systems made up of multiple computing systems as described above, multiple virtual assets, server computing systems, workstations, desktop computing systems, database systems or storage clusters, switching systems, routers, hardware systems, communications systems, proxy systems, gateway systems, firewall systems, load balancing systems, or any devices that can be used to perform the processes and/or operations as described herein.

As used herein, the term "virtual asset" includes any virtualized entity or resource, and/or actual, or "bare metal" entity requiring access to various resources, and types of resources. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and or delivered through, a cloud computing environment; communications systems used with, part of, or provided through, a cloud computing environment; and/or any other virtualized assets and/or sub-systems of "hard metal" physical devices such as mobile devices, remote sensors, laptops, desktops, point-of-sale devices, ATMs, electronic voting machines, etc. requiring access to various resources, and/or types of resources, located within a data center, within a cloud computing environment, and/or any other physical or logical location, as discussed herein, and/or as known/available in the art at the time of filing, and/or as developed/made available after the time of filing.

In various embodiments, the one or more computing systems implementing the process for distributed authentication are logically or physically located, and/or associated with, two or more computing environments. As used herein, the term "computing environment" includes, but is not limited to, a logical or physical grouping of connected or networked computing systems using the same infrastructure and systems such as, but not limited to, hardware systems, software systems, and networking/communications systems.

In one embodiment, two or more computing systems, and/or two or more computing environments, are operatively coupled to each other through one or more communications channels or pathways, and/or distributed computing system networks, such as, but not limited to: a public cloud; a private cloud; a virtual private cloud (VPC); a subnet; any general network, communications network, or general network/communications network system; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In one embodiment, methods and systems discussed herein provide a technical solution to the technical problem of failing to ensure that only valid, authorized persons are granted access to or are otherwise allowed to use secure computing systems, provided that there is a good reason to grant access.

In one embodiment, receipt of access request data, from a first computing system, e.g. a user computing system, representing an access request initiated by a user of the first computing system, is made at a second computing system, e.g. a secure computing system. Responsive to receipt of that request, the secure computing system establishes a secure communications path with a third computing system, e.g. a validation computing system, and results data on or accessible to the validation computing system is accessed to determine whether the user submitting the request is a valid, authorized user of the secure computing system. Further, in various embodiments, a reason indicated by reason data submitted within or with the request data must correspond to previously validated reasons reflected in the results data. If all access conditions are met, the validation computing system results data is updated to reflect that the requesting user is allowed access to the secure computing system, a condition that is detected by the secure computing system through communication by the secure computing system with the validation computing system. Following confirmation of the user being validated, the secure computing system establishes a secure communications path with the user computing system associated with the user who submitted the request. In one embodiment, the authorization processes discussed herein are applied to a computing system associated with the user so that only previously authorized computing systems are granted authority to interact with the secure computing system.

In one embodiment, the access request represented by at least a portion of the request data is provided by the user computing system to both of the validation computing system and secure computing system.

The summary of the technical solution provided above provides a detailed solution to a technical problem existing throughout computing system technologies. The solution applies to all types of computing systems including desktop systems, mobile computing systems, virtual assets such as virtual machines, databases, and other network accessible devices. For reasons provided above, the subject matter herein falls outside the realm of an abstract idea, and is additionally significantly more than an abstract idea.

In accordance with one embodiment, a system for distributed authentication includes at least one computing processor, and computer machine-level or high-level executable instructions representing the process operations described herein are stored within and are executed from at least one memory coupled to the at least one computing processor.

FIG. 1 is a functional block diagram showing the interaction of various elements for implementing one embodiment of a system for distributed authentication.

Referring to FIG. 1, in one embodiment, a system 100 for distributed authentication as depicted in FIG. 1 includes computing systems 102 and 104 and mobile computing system 106, each of which are operated or otherwise controlled by users, system administrators, solution providers, etc. In one embodiment, computing systems 102 and 104, and mobile computing system 106 are each communicatively coupled through network 108 to secure computing system 110 and validation computing system 112.

Herein, when reference is made to a validation computing system, such as validation computing system 112, it is intended that one, two, or more validation computing system perform portions, or all, of the validation processes discussed herein. Should two or more validation computing systems be employed, each performing different portions of the validation processes, or perhaps even performing overlapping portions of the validations processes, those two or more validation computing systems must agree, in one embodiment, in order for a given requesting user to be allowed access to the secure computing system, such as secure computing system 110. In one embodiment, secure computing system 110 performs limited validation processes, such as validating a username or password as being the same as a username or password previously provided to validation computing system 112, or validating a public key provided by a requesting user as being the same as a public key previously provided to validation computing system 110.

As explained above, as used herein, the term "computing system", includes, but is not limited to, a server computing system, a workstation, a desktop computing system, a database system or storage cluster, a switching system, a router, any virtual asset such as a virtual machine, database, or other virtual asset known to those of ordinary skill or later developed, any hardware system, any communications systems, any form of proxy system, a gateway system, a firewall system, a load balancing system, or any device, subsystem, or mechanism that includes components that can execute all, or part, of any one of the processes and/or operations as described herein.

Furthermore, the term network includes all currently known processes, methods, devices, and protocols for two or more computing systems to communicate with each other. This includes, for example, hard wired communications pathways, and wireless communication pathways, among others, as discussed herein.

In one embodiment, secure computing system 110 is configured to only accept access requests that have been previously validated or otherwise authorized by a validation computing system, such as validation computing system 112. Thus, any access requests sent to or otherwise provided directly to secure computing system 110 by any requesting computing system, such as computing systems 102 and 104 and mobile computing system 106, will be denied unless validation computing system 112 indicates that a user of a given computing system initiating the request is authorized to access secure computing system 110. In one embodiment, access requests provided by validation computing system 112 to secure computing system 110 will also be denied by secure computing system 110, even if validation computing system 112 indicates that validation computing system 112 is authorized to access or otherwise initiate a connection to secure computing system 110. In one embodiment, secure computing system 110 is configured to establish and control a secure communication pathway with any of computing systems 102 and 104, and/or mobile computing system 106, if validation computing system has performed validation processes discussed herein and has determined that a requesting computing system, such as any of computing systems 102 and 104, and/or mobile computing system 106, is currently authorized access to secure computing system 110.

System 100 for distributed authentication includes, in one embodiment, process operations of a process for distributed authentication executed by one or more computing processors of one or more computing systems, such as any of computing systems 102 and 104, mobile computing system 106, secure computing system 110 and validation computing system 112.

The process executed by the one or more computing processors includes receiving, at a secure computing system, request data representing a request for access to a secure computing system.

In one embodiment, request data provided to secure computing system 110 by a computing system of the user, such as any of computing systems 102 and 104, and mobile computing system 106 includes login data associated with the user. In one embodiment, the login data includes personal characteristic data of the user which is later used in validation process operations of validation computing system 112. In one embodiment, the login data includes personal characteristic data of the user which is later used by either or both of validation computing system 112 and secure computing system 110 to ensure that the accessing user is an authorized user allowed to access secure computing system 110.

In one embodiment, following receipt of the request data at secure computing system 110, at least a portion of the request data is forwarded by secure computing system 110 to validation computing system 112. In one embodiment, forwarding at least a portion of the request data includes establishing a secure communications path between secure computing system 110 and validation computing system 112, and thereafter forwarding at least a portion of the request data from secure computing system 110 to validation computing system 112 over that secure communications path. In one embodiment, secure computing system 110 establishes and controls the secure communications path between secure computing system 110 and validation computing system 112. In one embodiment, the secure communications path is configured to deny direct access requests and other communication initiated by validation computing system 112 and destined for secure computing system 110. Thus, in one embodiment, validation computing system 112 may only communicate with secure computing system 110 through a secure communications path established and controlled by secure computing system 110. In one embodiment, the secure communications path is configured to only allow communications initiated by validation computing system 112 that are provided in response to a previously submitted communication initiated by secure computing system 110.

In one embodiment, at least a portion of the request data forwarded to validation computing system 112 is used in one or more validation process operations in an attempt to validate a user or computing system associated with the request data embodying the access request.

In one embodiment, following receipt of the request data at validation computing system 112, validation process operations are performed by validation computing system 112, resulting in a user associated with the request data as being authorized to access secure computing system 110.

If, alternatively, the user is not validated, either because validation processes of validation computing system 112 indicate that the user is not authorized to access secure computing system 110, or after a predetermined time period has passed since the access request was received, the access request is invalidated, denied, or otherwise refused, and the process ends, according to one embodiment.

In one embodiment, one or more validation processes of validation computing system 112 are performed independently of an access request being forwarded to validation computing system 112. In one embodiment, validation process operations are initiated prior to an access request being received at secure computing system 110. In one embodiment, validation process operations performed prior to an access request being received at secure computing system 110 are performed responsive to recognition by validation computing system of one or more predetermined conditions internal or external to secure computing system 110 are currently existing, by either of secure computing system 110 or validation computing system 112, a monitoring computing system (not shown), or through any other means known to those of ordinary skill in the art or later developed.

In one embodiment, validation process operations are initiated prior to communication between secure computing system 110 and validation computing system 112 being initiated. In one embodiment, validation process operations are initiated prior to an access request being received at secure computing system 110.

Following validation, by validation computing system 112, of the user as being an authorized user and optionally further validation processes confirming that the access being requested is for an authorized reason, the process proceeds, in one embodiment, with enabling, by validation computing system 112, access to secure computing system 110 by the user. In one embodiment, the validation processes also determine whether a requesting computing system associated with the user, such as any of computing systems 102 and 104, and mobile computing system 106, should be granted access to secure computing system 110. In one embodiment, enabling access to secure computing system 110 includes providing secure computing system 110 access to validation results data stored on validation computing system 112 reflecting results of the validation process. In one embodiment, providing results data to secure computing system 110 includes making the results data available to secure computing system 110 so that secure computing system 110 may access validation computing system 112 and use the results data when needed.

In one embodiment, access to secure computing system 110 is granted in advance of a request for access being submitted from a computing system associated with the user, such as any of computing systems 102 and 104, and mobile computing system 106. In one embodiment, granting access to secure computing system 110 is based on a prior granted request for access by the same user. In one embodiment, granting access to secure computing system 110 is based on a prior granted request for access by the same user using the same computing system associated with the prior request, such as any of computing systems 102 and 104, and mobile computing system 106. In one embodiment, granting access to secure computing system 110 is based on a prior request for access by the same user and associated with a same reason as was associated with the prior request.

In one embodiment, following the validation of a user and/or computing system by validation computing system 112, and enablement of access for one or more of that user and computing system associated with the user, such as any of computing systems 102 and 104, and mobile computing system 106, receives a communication request initiated by secure computing system 110. In one embodiment, prior to secure computing system 110 initiating a communication request to the computing system associated with the user, secure computing system 110 first establishes a secure communication pathway between secure computing system 110 and the computing system associated with the user, such as any of computing systems 102 and 104, and mobile computing system 106.

These and other embodiments are discussed in more detail below.

Figure 2:
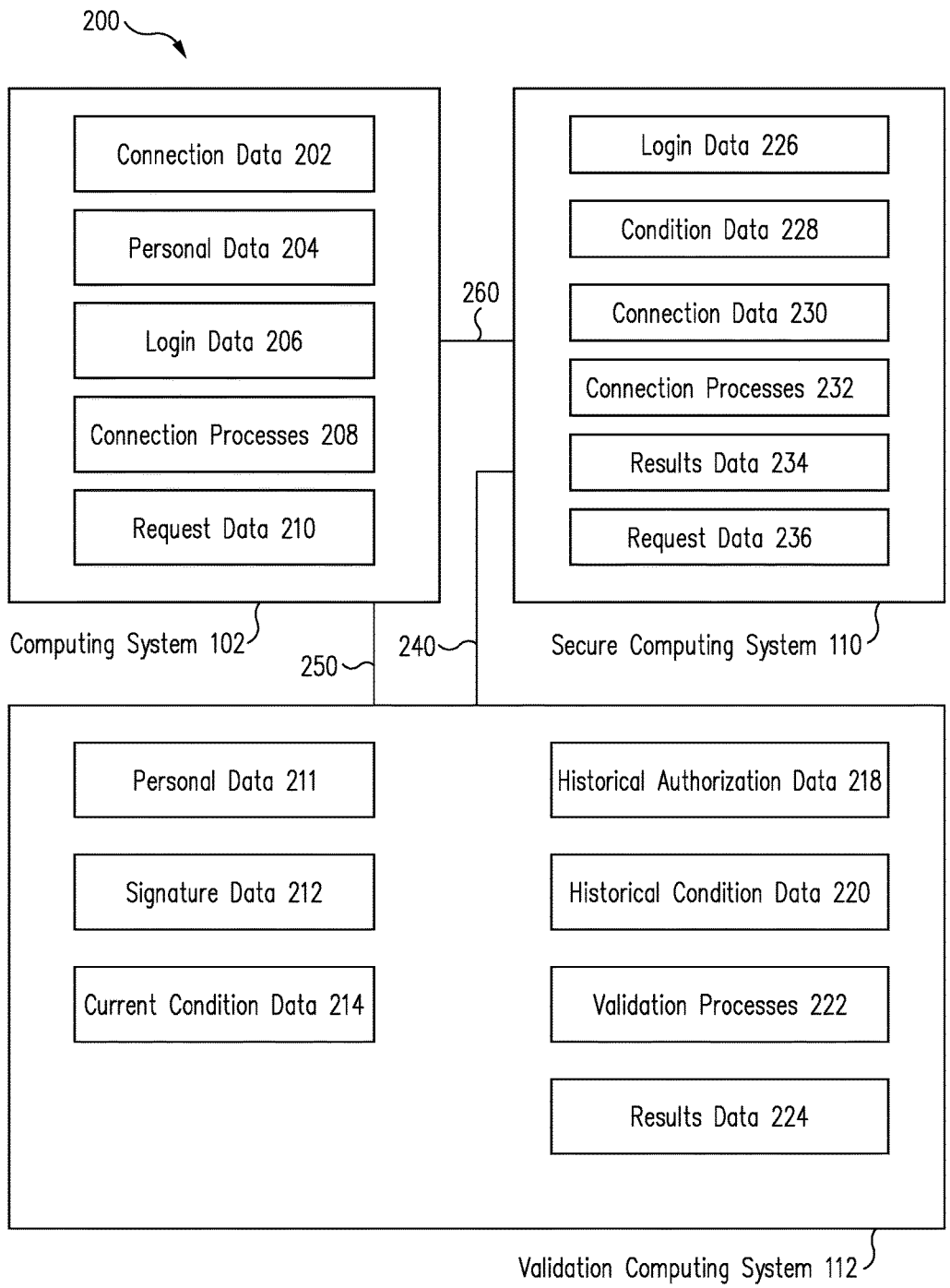
FIG. 2 is a detailed functional diagram of a system for distributed authentication in accordance with one embodiment.

FIG. 2 is a detailed functional diagram of a system for distributed authentication in accordance with one embodiment.

Referring to FIG. 1 and FIG. 2 together, in one embodiment, a system 200 for distributed authentication includes computing system 102 (also referred to herein as a first computing system), secure computing system 110 (also referred to herein as a second computing system) and validation computing system 112 (also referred to herein as a third computing system). Although other computing systems, such as computing system 104 and mobile computing system 106 are not reflected in FIG. 2, these other computing systems may also be employed in systems incorporating the embodiments discussed herein, without departing from the scope of this disclosure. In one embodiment, computing system 102, secure computing system 110 and validation computing system 112 are each communicatively coupled through communication pathways or networks described herein. In one embodiment, those pathways are typically secured from intrusions, eavesdropping, connection hijacking or other nefarious acts through encryption or other means. In one embodiment, secure socket shell (SSH) is employed to create a secure communication pathway between two computing systems when needed. Other methods known to persons of ordinary skill may be employed as well, or alternatively, including methods and protocols later developed.

As explained above, as used herein, the term "computing system", includes, but is not limited to, a server computing system, a workstation, a desktop computing system, a database system or storage cluster, a switching system, a router, any virtual asset such as a virtual machine, database, or other virtual asset known to those of ordinary skill or later developed, any hardware system, any communications systems, any form of proxy system, a gateway system, a firewall system, a load balancing system, or any device, subsystem, or mechanism that includes components that can execute all, or part, of any one of the processes and/or operations as described herein.

Furthermore, the terms network and communications pathway includes all currently known and later developed processes, methods, devices, and protocols for two computing systems to communicate with each other. This includes, for example, hard wired communications pathways, and wireless communication pathways, among others, as discussed herein.

In one embodiment, computing system 102 is typically a user computing system of or associated with a user desiring access to secure computing system 110, access to which is restricted to only users and/or computing systems that have been validated as authorized by validation computing system 112.

In various embodiments, computing system 102 includes one or more of connection data 202, personal data 204, login data 206, connection processes 208 and request data 210.

In one embodiment, a user of computing system 102 initiates an access request, through connection processes 208 which use at least a portion of login data 206 to prepare and submit an access request, evidenced within request data 210, to access secure computing system 110 using one or more communication protocols set forth in connection data 202, over a communication pathway established between computing system 102 and secure computing system 110, such as communication pathway 260.

Connection processes 208 include, in one embodiment, computing processor executable instructions to perform one or more of the process operations discussed herein.

Connection data 202 includes, in various embodiments, one or more of an IP address of secure computing system 110, data regarding one or more connection protocols used in prior successful connection events between computing system 102 and secure computing system 110, and data regarding one or more connection protocols available to be utilized for connections between computing system 102 and any other computing systems. In one embodiment, at least a portion of connection data 202 is provided to either or both of secure computing system 110 and validation computing system 112 at some time before a secure connection is established between computing system 102 and secure computing system 110 after validation processes are completed, and is used to determine one or more access parameters to be used when secure computing system 110 and computing system 102 eventually communicate over a secure communication pathway.

Login data 206 includes, in one embodiment, login data identifying the unique user of computing system 102 who requests access to secure computing system 110, such as one or more usernames of the user, one or more passwords of the user, one or more passphrases of the user, one or more public and/or private encryption keys of the user, one or more digital certificates of the user, multifactor authentication data of the user, one or more account numbers of the user, one or more identification numbers of the user, and any combination thereof, or any other login data identifying the unique user of computing system 102.

In one embodiment, login data 206 includes reason data (not shown) which indicates a reason the user desires access to secure computing system 110. The reason data includes, in various embodiments, one or more of: an internal condition of the secure computing system is outside predetermined normal operating parameters, an internal event has negatively affected the operation of the secure computing system, an external event has negatively affected the operation of the secure computing system, a process load level of a processor of the secure computing system is higher than a predetermined threshold, a memory usage level of a processor of the secure computing system is higher than a predetermined threshold, a storage platform associated with the secure computing system has less than a predetermined threshold amount of available capacity, a security event has occurred that affects the secure computing system, and a malware event has occurred that affects the secure computing system.

In one embodiment, at least a portion of login data 206 is combined with at least a portion of personal data 204 when request data 210 is prepared and submitted. In various embodiments, personal data 204 includes one or more of biometric data such as fingerprint data, retinal scan data, facial scan data, handwriting data and voice pattern data. In various embodiments, the biometric data of personal data 204 is data generated by a biometric component of computing system 102, such as by a facial scanner, a retinal scanner, a voice pattern generator, and the like. In one embodiment, personal data 204 represents personal information about the user of computing system 102 that is only known by the user and an administrator associated with validation computing system 112. In one embodiment, at least a portion of personal data 204 is protected from viewing and is also protected from alteration, such as through the use of one or more of one way hashes and encryption applied to portions of personal data 204 to be protected.

As discussed above, a user of computing system 102 initiates an access request through connection processes 208 which use at least a portion of login data 206 to prepare and submit a request to access secure computing system 110 using one or more communication protocols set forth in connection data 202.

In one embodiment, secure computing system 110 is configured to only accept access requests that have been previously validated or otherwise authorized by a validation computing system, such as validation computing system 112. Thus, any access requests sent to or otherwise provided to secure computing system 110 by any requesting computing system, such as computing system 102, will be denied unless validation computing system 112 indicates that a user of a given computing system, such as computing system 102, initiating the request is authorized to access secure computing system 110.

In one embodiment, access requests initiated and provided by validation computing system 112 to secure computing system 110 will also be denied by secure computing system 110, even if validation computing system 112 indicates that validation computing system 112 is authorized to access secure computing system 110.

In one embodiment, request data, such as request data 210, provided to secure computing system 110 by a computing system of the user, such as computing system 102, includes login data associated with the user, such as at least a portion of login data 206. In one embodiment, the login data provided to secure computing system 110 by a computing system of the user, such as computing system 102, includes personal characteristic data of the user, such as a portion of personal data 204 at least a portion of which is provided by secure computing system 110 to validation computing system 112 and later used in validation process operations of validation computing system 112.

In one embodiment, secure computing system 110 includes one or more of login data 226, condition data 228, connection data 230, connection processes 232, results data 234, and request data 236.

Login data 226 includes, in one embodiment, data identifying one or more users previously allowed access to secure computing system 110, such as one or more usernames, passwords, private encryption keys, public encryption keys, or any other data identifying users previously allowed access to secure computing system 110. In one embodiment, login data 226 includes data received from validation computing system 112.

In one embodiment, login data 226 includes reason data which indicates a reason a given user was granted access, whether that access was previously provided access or alternatively was recently validated. The reason data includes, in various embodiments, one or more reasons such as that an internal condition of the secure computing system is outside predetermined normal operating parameters, an internal event has negatively affected the operation of the secure computing system, an external event has negatively affected the operation of the secure computing system, a process load level of a processor of the secure computing system is higher than a predetermined threshold, a memory usage level of a processor of the secure computing system is higher than a predetermined threshold, a storage platform associated with the secure computing system has less than a predetermined threshold amount of available capacity, a security event has occurred that affects the secure computing system; and a malware event has occurred that affects the secure computing system.

In one embodiment, login data 226 includes personal characteristic data of a user of computing system 102 which was provided to validation computing system 112 and used in validation process operations of validation computing system 112. In one embodiment, login data 226 includes personal characteristic data of personal data 204 of the user which was used by either or both of validation computing system 112 and secure computing system 110 to ensure that the accessing user is an authorized user allowed to access secure computing system 110.

In one embodiment, following receipt of request data 210 at secure computing system 110, at least a portion of the received request data 210 is combined with request data 236 and then forwarded by secure computing system 110 to validation computing system 112 over a secure communication pathway, such as secure communication pathway 240. In one embodiment, the received request data, such as at least a portion of request data 210, is combined with condition data 228 representing a current condition of secure computing system 110 and then forwarded by secure computing system 110 to validation computing system 112. In one embodiment, condition data 228 representing a current condition of secure computing system 110 is forwarded by secure computing system 110 to validation computing system 112 independently of the forwarding of the received request data, i.e. the at least a portion of request data 210.

In one embodiment, results data 234 of secure computing system 110 includes data reflecting results of one or more previously performed validation processes.

In one embodiment, validation computing system 112 includes one or more of personal data 211, signature data 212, current condition data 214, historical authorization data 218, historical condition data 220, validation processes 222, and results data 224.

In one embodiment, following receipt of an access request, represented by at least a portion of request data 210, by secure computing system 110 from computing system 102, at least a portion of request data 210 is forwarded by secure computing system 110 to validation computing system 112.

As explained above, when reference is made herein refers to a "portion", or "at least a portion," of something, such as "at least a portion of request data 210." It is intended that the words refer to any piece or subset, however small or large, of the entity being referred to, including the entirety of the entity. Thus, "at least a portion of request data 210" includes any piece of request data 210, however small or large, up to and including the entirety of request data 210. In a concrete example, if request data 210 includes 100 bits of data, "at least a portion of request data 210" includes at least one bit of the 100 bits of request data 210, but could also include all 100 bits of request data 210.

In one embodiment, forwarding at least a portion of request data 210 includes first establishing a secure communications pathway, such as secure communication pathway 240, between secure computing system 110 and validation computing system 112, and thereafter forwarding at least a portion of request data 210 from secure computing system 110 to validation computing system 112 over that secure communications pathway, such as secure communication pathway 240. In one embodiment, secure computing system 110 establishes and controls any secure communications path between secure computing system 110 and validation computing system 112. In one embodiment, either or both of secure computing system 110 and the secure communications pathway, such as secure communication pathway 240, are configured to deny access requests and other communication originated by validation computing system 112 and destined for secure computing system 110. Thus, in one embodiment, validation computing system 112 may only communicate with secure computing system 110 through a secure communications path established and controlled by secure computing system 110. In one embodiment, either or both of secure computing system 110 and the secure communications pathway 240 are configured to only allow communications initiated by validation computing system 112 that are provided in response to a previously submitted communication initiated by secure computing system 110.

In one embodiment, at least a portion of request data 210 forwarded to validation computing system 112 is used in one or more validation process operations in an attempt to validate a user or computing system associated with the access request of request data 210.

In one embodiment, following receipt of the at least a portion of request data 210 at validation computing system 112, validation process operations are performed by validation computing system 112, resulting in a user associated with the request of request data 210 as being authorized to access secure computing system 110.

If, alternatively, the user is not validated, either because validation processes, such as validation processes 222, result in a determination that the user is not authorized to access secure computing system 110, or after a predetermined time period has passed since the at least a portion of request data 210 was received by either of secure computing system 110 or validation computing system 112, the access request is invalidated, denied, or otherwise refused, and the process ends, according to one embodiment.

In one embodiment, validation processes 222 utilize one or more of at least a portion of historical authorization data 218 and historical condition data 220 when making a determination of whether the requesting user is authorized to access secure computing system 110.

Historical authorization data 218 includes, in various embodiments, data regarding granted access requests, denied access requests, lengths of time individual access requests were active before being utilized by the user to access secure computing system 110, lengths of time that users spent to correct problems associated with conditions specified within historical condition data 220.

Historical condition data 220 includes, in one embodiment, one or more conditions existing internal to or external to secure computing system that have been affected or corrected by a user accessing secure computing system 110.

In one embodiment, historical condition data 220, includes, in various embodiments, one or more instances of one or more conditions including that an internal condition of the secure computing system is outside predetermined normal operating parameters, a particular specified internal event that negatively affected the operation of the secure computing system, a particular specified external event that negatively affected the operation of the secure computing system, a process load level of a processor of the secure computing system that was higher than a predetermined threshold, a memory usage level of a processor of the secure computing system that higher than a predetermined threshold, a storage platform associated with the secure computing system that had less than a predetermined threshold amount of available capacity, a security event that occurred that affected the secure computing system, and a malware event that occurred that affected the secure computing system.

In addition to the conditions shown above, condition data regarding dates and times of the occurrence of a given condition, which users have successfully corrected or affected the condition, and how long a given condition was present before the user was able to provide corrective action are present in either or both of historical authorization data 218 and historical condition data 220.

In one embodiment, personal data 211 includes personal data of one or more users that have been previously registered to be provided access to secure computing system 110. In one embodiment, personal data 211 includes one or more of biometric data such as fingerprint data, retinal scan data, facial scan data, handwriting data and voice pattern data of the one or more registered users. In one embodiment, biometric data of personal data 211 is data previously generated by a biometric module of computing system 102, such as by a facial scanner, a retinal scanner, a voice pattern generator, and the like, and provided to validation computing system 112 during or otherwise contiguous in time with registration as a record of identity to later be used in validation processes, such as validation processes 222. In one embodiment, personal data 211 includes data about the user of computing system 102 that is only known by the user and an administrator associated with validation computing system 112. In one embodiment, at least a portion of personal data 211 is protected from viewing and is also protected from alteration, such as through the use of one or more of one way hashes and encryption applied to portions of personal data 211 to be protected.

In one embodiment, signature data 212 includes data regarding one more computing systems used or otherwise controlled by users registered to submit requests to access secure computing system 110. In one embodiment, signature data 212 is collected during a registration process when a user registers to be granted access to secure computing system 110. In one embodiment, current signature data is collected from computing system 102 during execution of validation processes 222 and compared with signature data 212 to determine whether the requesting user is using the same computing system to initiate the access request that they also used when the user registered to be able to access secure computing system 110.

In one embodiment, data identifying users of personal data 211 and data regarding computing systems the user is associated with are mapped together. In one embodiment, signature data 212 includes one or more of digital serial numbers of hardware installed within or otherwise associated with the computing system, mac addresses, TCP/IP configuration, operating system characteristics, and other characteristics known to those of ordinary skill of computing systems used or otherwise controlled by users registered to submit requests to access secure computing system 110.

In one embodiment, at least a portion of signature data 212 is used by validation processes 222 to determine whether a given user desiring access to secure computing system 110 is using a computing system that has been previously registered or previously used to access secure computing system 110.

In one embodiment, current condition data 214 is created from internal or external monitoring of secure computing system 110. In one embodiment, current condition data 214 is received from secure computing system 110 over a secure communications pathway, such as secure communication pathway 240 or a different secure communication pathway established and controlled by secure computing system 110, and includes at least a portion of condition data 228. Current condition data 214 includes a current status of secure computing system 110 or an associated computing system that can affect secure computing system 110. Current condition data 214 includes, in various embodiments, one or more of: an internal condition of the secure computing system is outside predetermined normal operating parameters, an internal event has negatively affected the operation of the secure computing system, an external event has negatively affected the operation of the secure computing system, a process load level of a processor of the secure computing system is higher than a predetermined threshold, a memory usage level of a processor of the secure computing system is higher than a predetermined threshold, a storage platform associated with the secure computing system has less than a predetermined threshold amount of available capacity, a security event has occurred that affects the secure computing system, and a malware event has occurred that affects the secure computing system.

In one embodiment, responsive to validation computing system 112 receiving at least a portion of request data 210 from secure computing system 110, validation computing system 112 executes one or more processes discussed herein, including one or more of validation processes 222.

In one embodiment, validation computing system determines whether the access request originated from an authorized user. In one embodiment, an administrator of validation computing system 112 performs the authentication through means external to validation computing system 112. In one embodiment, an administrator contacts the requesting user on the telephone and verifies that whether requesting user can respond correctly to questions regarding portions of personal data 211 that apply to the requesting user. In one embodiment, the administrator is empowered to override any validation processes of validation computing system 112 and enable access to secure computing 110 for a user based at least partly on the administrator's personal knowledge of a given user. In one embodiment, regardless of the outcome of validation processes performed automatically as discussed herein, the administrator triggers enablement of access for a user, causing results data 224 to reflect that the user is authentic. In one embodiment, regardless of the outcome of validation processes performed automatically as discussed herein, the administrator triggers denial of access for a user, causing any access requests the user has submitted to be ignored or otherwise expired without access being granted.

In one embodiment, following an administrator determining that a given user is authorized to access secure computing system 110, historical authorization data 218 and historical condition data 220 are both updated to reflect the determination, thus improving the data sets from which future determinations will be made.

In one embodiment, the administrator's verification is performed together with one or more other validation processes, such as validation processes 222, discussed herein. In one embodiment, a determination by validation computing system 112 of whether to grant the access request represented by the at least a portion of request data 210 is made by validation computing system 112 establishing a secure connection with computing system 102 and comparing personal data 204 with personal data 211. If personal data 204 matches at least a portion of personal data 211 to at least a degree of accuracy exceeding a predetermined threshold degree of accuracy, the user is considered validated.

In one embodiment, live biometric data received at validation computing system 112 from computing system 102 over a secure communication pathway, such as secure communication pathway 250. If the live biometric data received from computing system 102 matches at least a portion of personal data 211 to at least a degree of accuracy exceeding a predetermined threshold degree of accuracy, the user is considered validated.

Following validation, by validation computing system 112, of a requesting user as being an authorized user of secure computing system 110, results data 224 is prepared, in one embodiment, and used to enable access for the requesting user to secure computing system 110. In one embodiment, secure communication pathway 240 previously established between secure computing system 110 and validation computing system 112 is used to provide results data 224 directly to secure computing system 110. In one embodiment, enablement of access to secure computing system 110 occurs when results data 224 is prepared by validation computing system 112 and secure computing system 110 accesses or otherwise receives results data 224.

In one embodiment, validation computing system 112 determines whether there is a valid reason for the requesting user to be provided access to secure computing system 110. In one embodiment, reason data associated with the user's access request is forwarded by computing system 102 to secure computing system 110 contiguously in time with the providing of the at least a portion of request data 210, which is then forwarded to validation computing system 112. In one embodiment, the forwarded reason data is compared with current condition data 214 and historical condition data 220 to inform a determination of whether the user should be granted access.

If, in one embodiment, a determination is made that current condition data 214 reflects a condition of or associated with secure computing system 110 that matches a reason reflected by the reason data submitted by the user, the user is validated as a user authorized to access secure computing system 110 and results data 224 is prepared which enables access to secure computing system 110 by the requesting user as discussed herein.

In one embodiment, access is enabled for the user only if current condition data 214 reflects a condition of or associated with secure computing system 110 that matches a reason reflected by the reason data submitted by the user and that reason is also a reason that is reflected in historical authorization data 218 reflecting that the user has previously been authorized access to secure computing system 110 for the same reason.

In one embodiment, at least some of validation processes 222 are performed independently of an access request, such as at least a portion of request data 210 being forwarded to validation computing system 112. In one embodiment, validation processes 222 are initiated prior to an access request being received at secure computing system 110. In one embodiment, validation processes 222 performed prior to an access request being received at secure computing system 110 are performed responsive to recognition by validation computing system 112 of one or more predetermined conditions internal or external to secure computing system 110, by either of secure computing system 110 or validation computing system 112, a monitoring computing system (not shown), or through any other means known to those of ordinary skill in the art or later developed.

In one embodiment, validation processes 222 are initiated prior to communication between secure computing system 110 and the validation computing system 112 being initiated. In one embodiment, validation processes 222 are initiated prior to an access request being received at secure computing system 110.

Following validation, by validation computing system 112, of the user as being an authorized user and optionally further validation processes confirming that the access request is being performed for an authorized reason, the process proceeds, in one embodiment, with enabling, by validation computing system 112, access to secure computing system 110 by the user.

These and other embodiments are elucidated by the flowchart discussed below.

Figure 3:
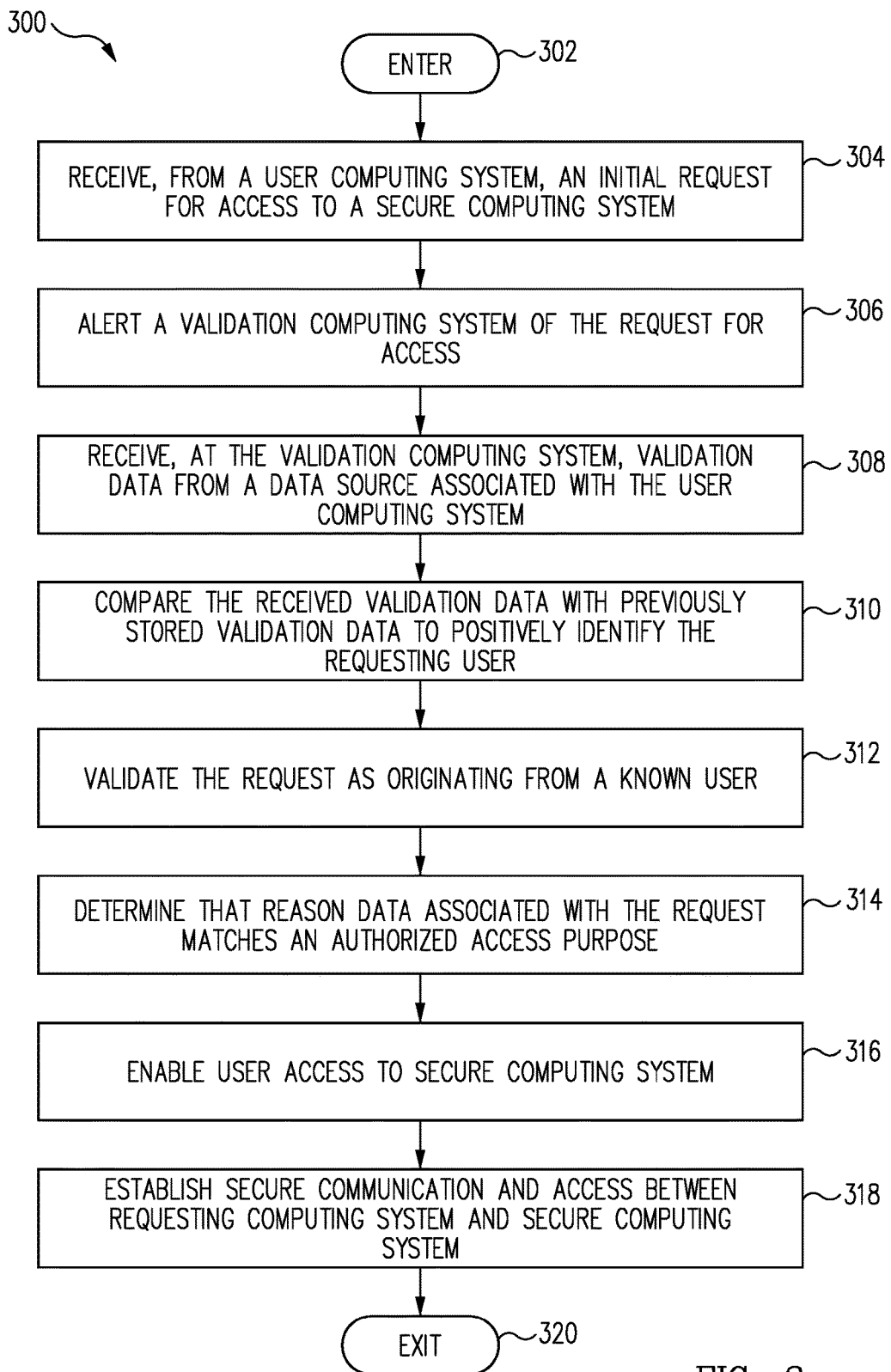
FIG. 3 is a flow chart depicting a process for distributed authentication in accordance with one embodiment.

FIG. 3 is a flow chart depicting a process for distributed authentication in accordance with one embodiment.

In accordance with one embodiment, a system for distributed authentication includes process operations of a process 300 for distributed authentication stored within memory modules of and executed by computing processors of one or more computing systems.

In one embodiment, methods and systems discussed herein provide a technical solution to the technical problem of failing to ensure that only valid, authorized persons are granted access to or are otherwise allowed to use secure computing systems, provided that there is a good reason to grant access.

In one embodiment, referring to FIGS. 2 and 3 together, process 300 for distributed authentication begins at ENTER OPERATION 302 and proceeds with RECEIVE, FROM A USER COMPUTING SYSTEM, AN INITIAL REQUEST FOR ACCESS TO A SECURE COMPUTING SYSTEM OPERATION 304.

In one embodiment, at RECEIVE, FROM A USER COMPUTING SYSTEM, AN INITIAL REQUEST FOR ACCESS TO A SECURE COMPUTING SYSTEM OPERATION 304, an access request is prepared by an originating source, such as computing system 102 of a user desiring access to secure computing system 110. Further, that access request, embodied in request data 210, is provided to secure computing system 110.

In one embodiment, at least a portion of request data 210 provided to secure computing system 110 by a computing system of the user, such as computing system 102, includes at least a portion of login data 206 associated with the user. In one embodiment, login data 206 includes personal characteristic data of the user which is later used in validation processes 222 of validation computing system 112.

In one embodiment, login data 206 includes personal characteristic data of the user which is later used by either or both of validation computing system 112 and secure computing system 110 to ensure that the accessing user is an authorized user allowed to access secure computing system 110.

In one embodiment, secure computing system 110 is configured to only accept access requests that have been previously validated or otherwise authorized by a validation computing system, such as validation computing system 112. Thus, any access requests send to or otherwise provided to secure computing system 110 by any requesting computing system, such as computing system 102, will be denied unless validation computing system 112 indicates that a user of a given computing system initiating the request is authorized to access secure computing system 110. In one embodiment, access requests provided by validation computing system 112 to secure computing system 110 will also be denied by secure computing system 110, even if validation computing system 112 indicates that validation computing system 112 is authorized to access or otherwise initiate a connection to secure computing system 110. In one embodiment, secure computing system 110 is configured to establish and control a secure communication pathway with computing system 102 if validation computing system 112 has completed validation processes 222 discussed herein and has determined that a requesting computing system such as computing system 102 is currently authorized access to secure computing system 110.

In one embodiment, responsive to receipt of an access request by secure computing system 110 of an access request from computing system 102, of RECEIVE, FROM A USER COMPUTING SYSTEM, AN INITIAL REQUEST FOR ACCESS TO A SECURE COMPUTING SYSTEM OPERATION 304, process flow proceeds with ALERT A VALIDATION COMPUTING SYSTEM OF THE REQUEST FOR ACCESS OPERATION 306.

Since secure computing system 110 is configured to ignore, deny, or otherwise not respond to requests from other computing systems, the access request provided by computing system 102 does not generally directly result in access to the user being granted, but request data 210 reflecting the access request is instead provided, at ALERT A VALIDATION COMPUTING SYSTEM OF THE REQUEST FOR ACCESS OPERATION 306, to a validation computing system, such as validation computing system 112.

In one embodiment, computing system 102, secure computing system 110 and validation computing system 112 are each independently and individually communicatively coupled through communication pathways or networks described herein. In one embodiment, prior to communication actually taking place between two of those computing systems, those pathways are secured from intrusions, eavesdropping, connection hijacking or other nefarious acts through encryption or other means. In one embodiment, secure socket shell (SSH) is employed to create a secure communication pathway between two of the above-mentioned computing systems when needed. Other methods known to persons of ordinary skill may be employed as well or alternatively, including methods later developed.

In one embodiment, at ALERT A VALIDATION COMPUTING SYSTEM OF THE REQUEST FOR ACCESS OPERATION 306, request data 210 representing the access request is provided through a secure connection pathway between the originating computing system, such as computing system 102, and the secure computing system, such as secure computing system 110. Since secure computing system 110 is configured to deny or otherwise ignore access requests that have not previously been validated by an validation computing system, such as by validating computing system 112, secure computing system 110 does not act directly on the access request embodied within request data 210, but instead passes at least a portion of request data 210, at ALERT A VALIDATION COMPUTING SYSTEM OF THE REQUEST FOR ACCESS OPERATION 306, along to the validation computing system, such as validation computing system 112.

In one embodiment, at least a portion of request data 210 forwarded to validation computing system 112, at ALERT A VALIDATION COMPUTING SYSTEM OF THE REQUEST FOR ACCESS OPERATION 306, is used in one or more validation process operations in an attempt to validate a user or computing system associated with the request associated with the request data.

In one embodiment, following receipt of the request data at validation computing system 112, validation processes 222 are initiated. However, in some circumstances, there is good reason to receive additional validation data from the user and/or computing system that initiated the access request. For example, it is desirable to concretely identify the user, through the use of personal data, for example, such as through the use of personal data 204, such as through the use of biometric data. The biometric data, optionally a subcomponent of personal data 204 may be initially created by a biometric component of computing system 102 and provided by computing system 102 as part of request data 204. Alternatively, at RECEIVE, AT THE VALIDATION COMPUTING SYSTEM, VALIDATION DATA FROM A DATA SOURCE ASSOCIATED WITH THE USER COMPUTING SYSTEM OPERATION 308, the additional personal data, such as biometric or other personal data of personal data 204 may be received through a secured communication channel between computing system 102 and validation computing system 112 that is established and controlled by either of computing system 102 or validation computing system 112.

In one embodiment, personal data 204 includes one or more of biometric data such as fingerprint data, retinal scan data, facial scan data, handwriting data and voice pattern data. In one embodiment, the biometric data of personal data 204 is data generated by a biometric component of computing system 102, such as by a facial scanner, a retinal scanner, a voice pattern generator, and the like. In one embodiment, personal data 204 includes data about the user of computing system 102 that is only known by the user and an administrator associated with validation computing system 112. In one embodiment, at least a portion of personal data 204 is protected from viewing and is also protected from alteration, such as through the use of one or more of one way hashes and encryption applied to portions of personal data 204 to be protected.

Following receipt of authentication data from a data source associated with computing system 102, for example, at RECEIVE, AT THE VALIDATION COMPUTING SYSTEM, VALIDATION DATA FROM A DATA SOURCE ASSOCIATED WITH THE USER COMPUTING SYSTEM OPERATION 308, process flow proceeds with COMPARE THE RECEIVED VALIDATION DATA WITH PREVIOUSLY STORED VALIDATION DATA TO POSITIVELY IDENTIFY THE REQUESTING USER OPERATION 310.

In one embodiment, at COMPARE THE RECEIVED VALIDATION DATA WITH PREVIOUSLY STORED VALIDATION DATA TO POSITIVELY IDENTIFY THE REQUESTING USER OPERATION 310, live biometric data or other personal data originating at personal data 204 is compared with at least a portion of personal data 211.

In one embodiment, personal data 211 includes personal data of one or more users that have been previously registered to be provided access to secure computing system 110. In one embodiment, personal data 211 includes one or more of biometric data such as fingerprint data, retinal scan data, facial scan data, handwriting data and voice pattern data of the one or more registered users. In one embodiment, biometric data of personal data 211 is data previously generated by a biometric module of computing system 102, such as by a facial scanner, a retinal scanner, a voice pattern generator, and the like, and provided to validation computing system 112 during or otherwise contiguous in time with registration as a record of identity to later be used in validation processes, such as validation processes 222. In one embodiment, personal data 211 includes data about the user of computing system 102 that is only known by the user and an administrator associated with validation computing system 112. In one embodiment, at least a portion of personal data 211 is protected from viewing and is also protected from alteration, such as through the use of one or more of one way hashes and encryption applied to portions of personal data 211 to be protected.

In one embodiment, at COMPARE THE RECEIVED VALIDATION DATA WITH PREVIOUSLY STORED VALIDATION DATA TO POSITIVELY IDENTIFY THE REQUESTING USER OPERATION 310, the comparison is performed to determine a degree of matching between one or more portions of personal data 204 received from computing system 102 and one or more portions of personal data 211 relating to the requesting user. Identifiers, such as usernames, user id number, passwords or other identifiers, provided in either login data or personal data submitted with the access request, or provided at other times are used to determine which portion of personal data 211 to use for comparison. Other methods may also be used that are known to those of ordinary skill in the art, or later developed.

If a determination is made that biometric data of personal data 204, for example, matches a portion of personal data 211 associated with the requesting user within a predetermined degree of accuracy, such as at least 80 percent matching, a user is considered validated as authentic, at VALIDATE THE REQUEST AS ORIGINATING FROM A KNOWN USER OPERATION 312, resulting in a user associated with the access request of request data 210 as being authorized to access secure computing system 110.

If, alternatively, the user is not validated as authentic, at VALIDATE THE REQUEST AS ORIGINATING FROM A KNOWN USER OPERATION 312, either because validation processes 222 indicate that the user is not authorized to access secure computing system 110, or after a predetermined time period has passed since the access request was received, the access request is invalidated, denied, or otherwise refused, and the process ends, according to one embodiment. In one embodiment, the validation processes 222 are performed independently of an access request being forwarded to validation computing system 112. In one embodiment, validation processes 222 are initiated prior to an access request being received at secure computing system 110. In one embodiment, validation processes 222 performed prior to an access request being received at secure computing system 110 are performed responsive to recognition by validation computing system 112 of one or more predetermined conditions internal or external to secure computing system 110 being recognized, by either of secure computing system 110 or validation computing system 112, a monitoring computing system (not shown), or through any other means known to those of ordinary skill in the art or later developed.

In one embodiment, responsive to validating, at VALIDATE THE REQUEST AS ORIGINATING FROM A KNOWN USER OPERATION 312, a user, computing system of the user, or an access request as being authorized, process flow proceeds with DETERMINE THAT REASON DATA ASSOCIATED WITH THE REQUEST MATCHES AN AUTHORIZED ACCESS PURPOSE OPERATION 314.

Recall that login data 206 and/or request data 210 includes, in one embodiment, reason data which indicates a reason the requesting user desires access. The reason data includes, in various embodiments, one or more reasons including that an internal condition of the secure computing system is outside predetermined normal operating parameters, an internal event has negatively affected the operation of the secure computing system, an external event has negatively affected the operation of the secure computing system, a process load level of a processor of the secure computing system is higher than a predetermined threshold, a memory usage level of a processor of the secure computing system is higher than a predetermined threshold, a storage platform associated with the secure computing system has less than a predetermined threshold amount of available capacity, a security event has occurred that affects the secure computing system; and a malware event has occurred that affects the secure computing system.

In one embodiment, at DETERMINE THAT REASON DATA ASSOCIATED WITH THE REQUEST MATCHES AN AUTHORIZED ACCESS PURPOSE OPERATION 314, validation computing system 112 determines whether there is a valid reason for the requesting user to be provided access to secure computing system 110. In one embodiment, reason data associated with the user's access request was forwarded by computing system 102 to secure computing system 110 contiguously in time with at least a portion of request data 210, which was then forwarded to validation computing system 112. In one embodiment, at DETERMINE THAT REASON DATA ASSOCIATED WITH THE REQUEST MATCHES AN AUTHORIZED ACCESS PURPOSE OPERATION 314, the forwarded reason data is compared with current condition data 214 and/or historical condition data 220 to inform a determination of whether the requesting user should be granted access.

If, in one embodiment, at DETERMINE THAT REASON DATA ASSOCIATED WITH THE REQUEST MATCHES AN AUTHORIZED ACCESS PURPOSE OPERATION 314, a determination is made that current condition data 214 reflects a condition of or associated with secure computing system 110 that matches a reason reflected by the reason data submitted by the user, the user is validated as a user authorized to access secure computing system 110.

In one embodiment, access will be granted to the user only if current condition data 214 reflects a condition of or associated with secure computing system 110 that matches a reason reflected by the reason data submitted by the user and that reason is also a reason that is reflected in one or more of historical authorization data 218 and historical condition data 220 reflecting that the user has previously been authorized access to secure computing system 110 for the same reason.

In one embodiment, at least some of validation processes 222 are performed independently of an access request. In one embodiment, validation processes 222 are initiated prior to an access request being received at secure computing system 110. In one embodiment, validation processes 222 performed prior to an access request being received at secure computing system 110 are performed responsive to recognition by validation computing system 112 of one or more predetermined conditions internal or external to secure computing system 110 are recognized, by either of secure computing system 110 or validation computing system 112, a monitoring computing system (not shown), or through any other means known to those of ordinary skill in the art or later developed.

In one embodiment, validation process operations are initiated prior to communication between secure computing system 110 and the validation computing system 112 being initiated. In one embodiment, validation processes 222 are initiated prior to an access request being received at secure computing system 110.

In one embodiment, responsive to a determination that the authorized user is requesting access for a currently valid or historically valid reason at DETERMINE THAT REASON DATA ASSOCIATED WITH THE REQUEST MATCHES AN AUTHORIZED ACCESS PURPOSE OPERATION 314, process flow proceeds with ENABLE USER ACCESS TO SECURE COMPUTING SYSTEM OPERATION 316.

In one embodiment, enabling access to secure computing system 110, at ENABLE USER ACCESS TO SECURE COMPUTING SYSTEM OPERATION 316, includes providing secure computing system 110 results data 224 reflecting the results provided by the validation process. In one embodiment, providing results data 224 to secure computing system 110 includes making results data 224 available to secure computing system 110 so that secure computing system 110 may access and use results data 224 when needed.

In one embodiment, if secure computing system 110 is configured to deny all direct, requests for access that have not been validated, secure computing system 110 is also configured to itself establish a secure communication pathway with validation computing system 112 on occasion, to pass at least a portion of request data 236 to validation computing system 112, receive the results of validation processes, such as results data 224, which becomes results data 234, and for any other needed reason. In these embodiments, secure computing system 110 controls the establishment and operation of the secure communication pathway between validation computing system 112 and secure computing system 110. In one embodiment, the access granted to the user with respect to secure computing system 110 is only granted for a limited period of time specified within results data 224 or results data 334. Following the expiration of that limited period of time, any connection pathways between computing system 102 and secure computing system 110 are terminated or otherwise closed by secure computing system 110. In one embodiment, the duration of the limited period of time is based on the reason the requesting user specified. In one embodiment, each valid reason is associated, in validation computing system 112, with a maximum time a user may be granted access, and that maximum time is used in determining the duration of the limited period of time. In one embodiment, the duration of the limited period of time is determined based on one or more historical durations of time associated with one or more users who have accessed secure computing system 110 for the same reasons as the requesting user specified. Such durations or maximum lengths of time may be stored as a subset of connection data 230 and provided to validation computing system 112 as needed.

Responsive to user access for a given user being enabled at ENABLE USER ACCESS TO SECURE COMPUTING SYSTEM OPERATION 316, process flow proceeds with ESTABLISH SECURE COMMUNICATION AND ACCESS BETWEEN REQUESTING COMPUTING ENVIRONMENT AND SECURE COMPUTING SYSTEM OPERATION 318.

In one embodiment, at ESTABLISH SECURE COMMUNICATION AND ACCESS BETWEEN REQUESTING COMPUTING SYSTEM AND SECURE COMPUTING SYSTEM OPERATION 318, secure computing system 110 establishes and maintains a secure communication pathway between secure computing system 110 and computing system 102 and allows a user of computing system 102 access to perform activities the user has been granted the rights to perform.

At EXIT OPERATION 320, the process exits, awaiting further data.

In an alternate embodiment, following validation by a user as being authorized to access a first secure computing system, examination is made of other related secure computing systems to determine whether that same user has previously accessed those other secure computing systems for prior conditions that also currently exist on individual ones of the other secure computing systems. If so, access is granted to the user for ones of those other secure computing systems as well, according to the validation processes discussed herein, regardless of whether the user has submitted a specific request to access those other secure computing systems.

In another alternate embodiment, in system where an admin user of validation computing system 112 manages access to many secure computing systems, such as fifty, 100, or more, it may sometimes be necessary to grant a newly authorized operations admin of secure computing systems access to several or all of the many secure computing systems. In one embodiment, results data 224 of validation computing system 112 includes unique data that only the newly authorized operations admin possesses, such as a public key of a public-private key pair of the newly authorized operations admin. In this embodiment, any of, or several of, the many secure computing systems then establish secure connections with validation computing system 112 and download or otherwise access results data 224 which indicates that the newly authorized admin is authorized to access several or all of the many secure computing systems, and establishes a secure connection pathway with the user's computing system, also optionally identified within results data 224, and allows the newly authorized admin access to perform their duties.

Of particular note, the various elements in FIGS. 1 and 2 are shown for illustrative purposes as being associated with specific computing environments. However, the exemplary placement of the various elements within these environments and systems in FIGS. 1 and 2 is made for illustrative purposes only and, in various embodiments, any individual element shown in FIGS. 1 and 2, or combination of elements shown in FIGS. 1 and 2, can be implemented and/or deployed on any of one or more various computing environments or systems, and/or architectural or infrastructure components, such as one or more hardware systems, one or more software systems, one or more data centers, one or more clouds or cloud types, one or more third party service capabilities, or any other computing environments, architectural, and/or infrastructure components as discussed herein, and/or as known in the art at the time of filing, and/or as developed/made available after the time of filing.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for providing distributed authentication comprising:
   at least one processor; and
   at least one memory coupled to the at least one processor, the at least one memory having stored therein instructions which when executed by the at least one processors, perform a process for distributed authentication, the process for distributed authentication including:
   receiving, at a secure computing system from a requesting computing system being operated by a requesting user, request data representing a request for access to the secure computing system, the secure computing system being configured to only accept access requests validated by a validating computing system and only allowing access if the requesting user also provides login data representing login credentials;
   forwarding, by the secure computing system, at least a portion of the request data to a validation computing system by:
      establishing a secure communications pathway between the secure computing system and the validation computing system allowing communication from the secure computing system and the validation computing system, wherein the secure communications pathway is established and controlled by the secure computer system, wherein the secure communications pathway is configured to refuse access requests and other communications initiated by the validation computing system; and
      forwarding, through the secure communications pathway by the secure computing system, at least a portion of the request data to the validation computing system;
   validating, by the validation computing system, a requesting user associated with the forwarded portion of the request data as being authorized to access the secure computing system;
   enabling, by the validating computing system, access to the secure computing system by the requesting computing system and the requesting user.

2. The system of claim 1 wherein validating, by the validation computing system, a user associated with the request data as being authorized to access the secure computing system further comprises validating, in advance of receiving the request data representing the request, by the validation computing system, a user associated with the request data as being authorized to access the secure computing system, the validation being responsive to the validation computing system determining that condition data matches reason data associated with the request data, the condition data representing a preauthorized condition associated with the secure computing system that has previously resulted, on one or more prior occasions, in the user being granted access permission to the secure computing system.

3. The system of claim 1 wherein
   receiving, at a secure computing system, a request for access to the secure computing system, the secure computing system being configured to only accept access requests validated by a validating computing system and only allowing access if a user requesting access also provides proper credentials; further comprises
   receiving, at a secure computing system, a request for access to the secure computing system, the secure computing system being configured to only accept access requests validated by a validating computing system and only allowing access if a user requesting access also provides proper credentials, the request including reason data indicating a reason associated with the request data; and further wherein
   validating, by the validation computing system, a user associated with the request data as being authorized to access the secure computing system; further comprises
   validating, by the validation computing system, a user associated with the request data as being authorized to access the secure computing system, wherein validation includes consideration of the reason data.

4. The system of claim 1 wherein
   receiving, at a secure computing system, a request for access to the secure computing system, the secure computing system being configured to only accept access requests validated by a validating computing system and only allowing access if a user requesting access also provides proper credentials further comprises
   receiving, at a secure computing system, a request for access to the secure computing system, the secure computing system being configured to only accept access requests validated by a validating computing system and only allowing access if a user requesting access also provides proper credentials, the request for access including login data specific to the user.

5. The system of claim 4 wherein the login data includes personal characteristic data of the user, and wherein
   validating, by the validation computing system, a user associated with the request data as being authorized to access the secure computing system further comprises
   comparing at least a portion of received personal characteristic data of the user with predetermined characteristic data previously stored on the validation computing system.

6. The system of claim 4 wherein the login data includes one or more of a user name and a password and reason data indicating a reason the user is desiring access, and wherein
   validating, by the validation computing system, a user associated with the request data as being authorized to access the secure computing system further comprises
   comparing at least a portion of the reason data with predetermined reason data previously stored on the validation computing system.

7. The system of claim 6 wherein reason data includes at least one reason selected from a group of reasons consisting of:
   an internal condition of the secure computing system is outside predetermined normal operating parameters;
   an internal event has negatively affected the operation of the secure computing system;

an external event has negatively affected the operation of the secure computing system;

a process load level of a processor of the secure computing system is higher than a predetermined threshold;

a memory usage level of a processor of the secure computing system is higher than a predetermined threshold;

a storage platform associated with the secure computing system has less than a predetermined threshold amount of available capacity;

a security event has occurred that affects the secure computing system; and a malware event has occurred that affects the secure computing system.

8. The system of claim 1 wherein the secure computing system is a computing system selected from the group of the computing systems consisting of:

a virtual machine;
a virtual server;
an instance in a cloud infrastructure;
a cloud infrastructure access system;
mobile devices;
remote sensors;
laptops;
desktops;
point-of-sale devices; and
a database.

9. The system of claim 1 wherein the login data includes at least one data item selected from a group of data items consisting of:

one or more usernames;
passwords;
one or more passphrases;
one or more encryption keys;
one or more digital certificates;
multifactor authentication data;
one or more account numbers;
one or more identification numbers; and
any combination thereof.

10. The system of claim 1 wherein enabling, by the validating computing system, access to the secure computing system by the requesting computing system further comprises changing, by and within the validation computing system, the configuration of results data to indicate that the requesting computing system is authorized to access the secure computing system; and establishing, by the secure computing system responsive to the validating computing system changing the configuration of results data to indicate that the requesting computing system is authorized to access the secure computing system, a secure communications channel between the requesting computing system and the secure communications system.

11. The method of claim 1 wherein there is a limited time window between receipt of the request and enabling access to the secure computing system by the requesting computing system, and if the enablement fails to take place within the limited time window, the request is invalidated.

12. The method of claim 1 wherein enabling, by the validating computing system, access to the secure computing system by the requesting computing system further comprises enabling, by the validating computing system for a limited time period, access to the secure computing system by the requesting computing system.

13. The system of claim 12 wherein a duration of the limited time period is dependent on the reason associated with the request data.

14. A method for providing distributed authentication comprising:

receiving, at a secure computing system, a request for access to the secure computing system, the request including reason data indicating a reason associated with the request;

forwarding, over an established communication path between the secure communication system and the validation computing system, by the secure computing system, at least a portion of the request to a validation computing system;

validating, by the validation computing system, both a user associated with the request and a requesting computing system associated with the user as being authorized to access the secure computing system, wherein validation includes consideration of the reason data;

enabling, by the validation computing system through the established communication path, access to the secure computing system by the requesting computing system by:

determining, through an examination of results data, whether the user is an authorized user of the secure computing system;

changing, by and within the validation computing system, the the results data to indicate that the requesting computing system is authorized to access the secure computing system; and establishing, by the secure computing system responsive to the validating computing system changing the configuration of results data to indicate that the requesting computing system is authorized to access the secure computing system, a secure communications channel between the requesting computing system and the secure communications system.

15. The method of claim 14 wherein receiving, at a secure computing system, a request for access to the secure computing system further comprises receiving, at a secure computing system from a requesting computing system, a request for access by a requesting computing system to the secure computing system, the request for access including login data specific to the user.

16. The method of claim 15 wherein the login data includes personal characteristic data of the user, and wherein validating, by the validation computing system, both a user associated with the request and a requesting computing system associated with the user as being authorized to access the secure computing system further comprises comparing at least a portion of received personal characteristic data of the user with predetermined characteristic data previously stored on the validation computing system.

17. The method of claim 15 wherein the login data includes one or more of a user name and a password and reason data indicating a reason the user desires access, and wherein validating, by the validation computing system, both a user associated with the request and a requesting computing system associated with the user as being authorized to access the secure computing system further comprises comparing at least a portion of the reason data with predetermined reason data previously stored on the validation computing system.

18. The method of claim 14 wherein forwarding, by the secure computing system, at least a portion of the request to a validation computing system further comprises
establishing a secure communications pathway between the secure computing system and the validation computing system allowing communication from the secure computing system and the validation computing system; and
forwarding, through the secure communications pathway by the secure computing system, at least a portion of the request to a validation computing system.

19. The system of claim 14 wherein the secure communications pathway is established and controlled by the secure computer system.

20. The system of claim 19 wherein the secure communications pathway is configured to refuse access requests and other communications initiated by the validation computing system.

21. The system of claim 17 wherein reason data includes at least one reason selected from a group of reasons consisting of:
an internal condition of the secure computing system is outside predetermined normal operating parameters;
an internal event has negatively affected the operation of the secure computing system;
an external event has negatively affected the operation of the secure computing system;
a process load level of a processor of the secure computing system is higher than a predetermined threshold;
a memory usage level of a processor of the secure computing system is higher than a predetermined threshold;
a storage platform associated with the secure computing system has less than a predetermined threshold amount of available capacity;
a security event has occurred that affects the secure computing system; and
a malware event has occurred that affects the secure computing system.

22. The system of claim 14 wherein the secure computing system is a computing system selected from the group of the computing systems consisting of:
a virtual machine;
a virtual server;
an instance in a cloud infrastructure;
a cloud infrastructure access system;
mobile devices;
remote sensors;
laptops;
desktops;
point-of-sale devices; and
a database.

23. The system of claim 17 wherein the login data includes at least one data item selected from a group of data items consisting of:
one or more usernames;
passwords;
one or more passphrases;
one or more encryption keys;
one or more digital certificates;
multifactor authentication data;
one or more account numbers;
one or more identification numbers; and
any combination thereof.

24. The system of claim 14 wherein there is a limited time window between receipt of the request and the enablement.

* * * * *